United States Patent
Lu et al.

(10) Patent No.: US 12,049,934 B2
(45) Date of Patent: Jul. 30, 2024

(54) CARBON FIBER CRYSTAL ORIENTATION IMPROVEMENT BY POLYMER MODIFICATION, FIBER STRETCHING AND OXIDATION FOR BRAKE APPLICATION

(71) Applicant: GOODRICH CORPORATION, Charlotte, NC (US)

(72) Inventors: Weiming Lu, Akron, OH (US); John Linck, Pueblo, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 774 days.

(21) Appl. No.: 15/936,195

(22) Filed: Mar. 26, 2018

(65) Prior Publication Data
US 2019/0293139 A1   Sep. 26, 2019

(51) Int. Cl.
| | |
|---|---|
| *F16D 69/00* | (2006.01) |
| *B29C 48/00* | (2019.01) |
| *B29C 48/05* | (2019.01) |
| *B29C 71/00* | (2006.01) |
| *C01B 32/05* | (2017.01) |
| *C08F 120/44* | (2006.01) |
| *D01F 6/18* | (2006.01) |
| *D01F 9/22* | (2006.01) |
| *F16D 69/02* | (2006.01) |

(Continued)

(52) U.S. Cl.
CPC ........ *F16D 69/023* (2013.01); *B29C 48/0018* (2019.02); *B29C 48/05* (2019.02); *B29C 71/0063* (2013.01); *C01B 32/05* (2017.08); *C08F 120/44* (2013.01); *D01F 6/18* (2013.01); *D01F 9/22* (2013.01); *B29K 2033/20* (2013.01); *B29K 2995/0041* (2013.01); *B29K 2995/0088* (2013.01); *B29L 2031/731* (2013.01); *F16D 2200/0052* (2013.01); *F16D 2200/0069* (2013.01); *F16D 2200/0082* (2013.01)

(58) Field of Classification Search
CPC .............................. F16D 69/023; C01B 32/05
See application file for complete search history.

(56) References Cited

U.S. PATENT DOCUMENTS

| | | | |
|---|---|---|---|
| 3,556,729 A | 1/1971 | Holsten et al. | |
| 3,917,776 A | 11/1975 | Sato et al. | |
| 4,610,860 A | 9/1986 | Mullen | |

(Continued)

OTHER PUBLICATIONS

European Patent Office, European Third Party Observations dated Aug. 11, 2020 in Application No. 19165232.0.

(Continued)

*Primary Examiner* — Nicholas R Krasnow
(74) *Attorney, Agent, or Firm* — SNELL & WILMER L.L.P (57) ABSTRACT

A method of making carbon fiber material according to various embodiments of the present disclosure includes forming a polymer resin to have a polydispersity index (PDI) that is less than approximately 2.5. The method further includes spinning the polymer resin to create an acrylic fiber having an acrylic fiber length. The method further includes oxidizing the acrylic fiber while stretching the acrylic fiber to create an oxidized fiber that has an oxidized fiber length that is at least one of greater than or equal to approximately 100 percent (100%) of the acrylic fiber length. The method further includes carbonizing the oxidized fiber to create a carbon fiber.

11 Claims, 6 Drawing Sheets

(51) Int. Cl.
*B29K 33/20* (2006.01)
*B29L 31/00* (2006.01)

(56) References Cited

U.S. PATENT DOCUMENTS

| | | | |
|---|---|---|---|
| 4,661,336 A | 4/1987 | McCabe | |
| 4,671,950 A | 6/1987 | Ogawa et al. | |
| 9,677,195 B2 | 1/2017 | Leon | |
| 2002/0156219 A1* | 10/2002 | Mazza | C08F 220/06 526/317.1 |
| 2002/0193538 A1* | 12/2002 | Matyjaszewski | C08F 136/08 526/172 |
| 2006/0183834 A1 | 8/2006 | Kuwahara et al. | |
| 2011/0038788 A1* | 2/2011 | Tanaka | D01F 9/22 526/341 |
| 2015/0174807 A1* | 6/2015 | Tang | B29C 71/02 264/29.2 |
| 2016/0018365 A1 | 6/2016 | Taylor | |
| 2016/0319894 A1* | 11/2016 | Lu | F16D 65/126 |
| 2018/0086858 A1* | 3/2018 | Knaus | C08F 120/06 |
| 2019/0315894 A1* | 10/2019 | Knaus | C08F 20/54 |

OTHER PUBLICATIONS

European Patent Office, European Search Report dated Jul. 8, 2019 in Application No. 19165232.0.
European Patent Office, European Office Action dated Oct. 19, 2022 in Application No. 19165232.0.

\* cited by examiner

CARBON FIBER CRYSTAL ORIENTATION IMPROVEMENT BY POLYMER MODIFICATION, FIBER STRETCHING AND OXIDATION FOR BRAKE APPLICATION

FIELD

The present disclosure relates to systems and methods for producing carbon fiber for use with disk brake systems in such a way as to cause the carbon fiber to have a relatively high carbon fiber crystal orientation (CFCO) to increase friction performance.

BACKGROUND

Aircraft typically include a disk brake system for braking operations during taxi, takeoff, and landing. The disk brake systems include friction disks which may be formed using a carbon fiber material. Some of the friction disks may be coupled to the wheel (rotors), and other friction disks may be coupled to a different, non-rotating structure (stators). Force may be applied along a common axis of the friction disks to force the rotors and stators together. As the disks make contact, friction between adjacent disks slows rotation of the rotors, thus slowing rotation of the wheels of the aircraft. Thus, relatively high friction performance between friction disks is desirable.

SUMMARY

A method of making carbon fiber material according to various embodiments of the present disclosure includes forming a polymer resin to have a polydispersity index (PDI) that is less than approximately 2.5. The method further includes spinning the polymer resin to create an acrylic fiber having an acrylic fiber length. The method further includes oxidizing the acrylic fiber while stretching the acrylic fiber to create an oxidized fiber that has an oxidized fiber length that is greater than or equal to approximately 100 percent (100%) of the acrylic fiber length. The method further includes carbonizing the oxidized fiber to create a carbon fiber.

In any of the foregoing embodiments, stretching the acrylic fiber includes stretching the acrylic fiber such that the oxidized fiber length is greater than approximately 100% and less than or equal to approximately 120% of the acrylic fiber length.

In any of the foregoing embodiments, stretching the acrylic fiber includes stretching the acrylic fiber such that the oxidized fiber length is greater than or equal to approximately 105% and less than or equal to approximately 120% of the acrylic fiber length.

Any of the foregoing embodiments may also include graphitizing the carbon fiber to form a relatively high modulus fiber.

In any of the foregoing embodiments, forming the polymer resin includes forming the polymer resin to have a molecular weight that is greater than approximately 200,000 grams per mole.

In any of the foregoing embodiments, forming the polymer resin includes forming the polymer resin to have an isotactic content that is greater than approximately 25%.

In any of the foregoing embodiments, forming the polymer resin includes forming the polymer resin to lack a small polymer chain to prevent a pre-spike in heat flow of the carbon fiber prior to a primary spike in the heat flow of the carbon fiber.

In any of the foregoing embodiments, oxidizing the acrylic fiber includes oxidizing the acrylic fiber to have a cyclization index that is greater than or equal to 0.65.

Also disclosed is a method of making carbon fiber material according to various embodiments of the present disclosure. The method includes forming a polymer resin to have a polydispersity index (PDI) that is less than approximately 2.5. The method also includes spinning the polymer resin to create an acrylic fiber. The method also includes oxidizing the acrylic fiber to create an oxidized fiber. The method also includes carbonizing the oxidized fiber to create a carbon fiber.

In any of the foregoing embodiments, forming the polymer resin includes forming the polymer resin to have a molecular weight that is greater, than approximately 200,000 grams per mole.

In any of the foregoing embodiments, forming the polymer resin includes forming the polymer resin to have an isotactic content that is greater than approximately 25%.

In any of the foregoing embodiments, forming the polymer resin includes forming the polymer resin to lack a small polymer chain to prevent a pre-spike in heat flow of the carbon fiber prior to a primary spike in the heat flow of the carbon fiber.

In any of the foregoing embodiments, forming the polymer resin includes polymerizing Acrylonitrile.

Any of the foregoing embodiments may also include stretching the acrylic fiber during the oxidizing to cause the oxidized fiber to have an oxidized fiber length that is greater than or equal to approximately 100 percent (100%) of an acrylic fiber length of the acrylic fiber.

In any of the foregoing embodiments, stretching the acrylic fiber includes stretching the acrylic fiber such that the oxidized fiber length is greater than or equal to approximately 100% and less than or equal to approximately 120% of the acrylic fiber length.

In any of the foregoing embodiments, stretching the acrylic fiber includes stretching the acrylic fiber such that the oxidized fiber length is greater than or equal to approximately 105% and less than or equal to approximately 120% of the acrylic fiber length.

Also disclosed is a carbon fiber having at least approximately 80 percent (80%) crystal orientation according to various embodiments of the present disclosure. The carbon fiber is formed by forming a polymer resin to have a polydispersity index (PDI) that is less than approximately 2.5. The carbon fiber is further formed by spinning the polymer resin to create an acrylic fiber having an acrylic fiber length. The carbon fiber is further formed by oxidizing the acrylic fiber while stretching the acrylic fiber to create an oxidized fiber that has an oxidized fiber length that is greater than or equal to approximately 100 percent (100%) of the acrylic fiber length. The carbon fiber is further formed by carbonizing the oxidized fiber to create the carbon fiber.

In any of the foregoing embodiments, stretching the acrylic fiber includes stretching the acrylic fiber such that the oxidized fiber length is greater than or equal to approximately 105% and less than or equal to approximately 120% of the acrylic fiber length.

In any of the foregoing embodiments, forming the polymer resin includes forming the polymer resin to have an isotactic content that is greater than approximately 25%.

In any of the foregoing embodiments, forming the polymer resin includes forming the polymer resin to lack a small polymer chain to prevent a pre-spike in heat flow of the carbon fiber prior to a primary spike in the heat flow of the carbon fiber.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Carbon/carbon parts ("C/C") in the form of friction disks (also referred to as a carbon/carbon brake disks) are commonly used for aircraft brake disks, race car brakes, and clutch disks and are formed using carbon fiber. Carbon/carbon brake disks are especially useful in these applications because of the superior high temperature characteristics. In particular, the carbon/carbon material used in C/C parts is a good conductor of heat and is able to dissipate heat generated during braking away from the braking surfaces. Carbon/carbon material is also highly resistant to heat damage, and thus, is capable of sustaining friction between brake surfaces during severe braking without a significant reduction in the friction coefficient or mechanical failure.

One method of manufacturing C/C materials involves fabrication of an oxidized polyacrylonitrile (PAN) or carbon fiber preform, followed by carbonization and chemical vapor infiltration (CVI) densification. The CVI cycles are continued, in conjunction with machining the preform between infiltration cycles if desired, until the desired part density is achieved.

It has been found by the inventors that crystal orientation (CO) of the carbon fiber (otherwise referred to as Carbon Fiber Crystal Orientation, CFCO) affects friction performance of the friction disks. In particular, it has been determined that an increase in CFCO results in an increased friction performance. Thus, it is desirable to create friction disks for use with disk brakes that include a carbon fiber material having a CFCO that is relatively high, such as above 75 percent (75%), 80%, 85%, 90%, or the like. Crystal orientation may be defined as a percentage of fibers in a material that are aligned along a common axis. For example, if the CFCO is 80%, 80% of the carbon fibers may be aligned along a common axis.

Figure 1:
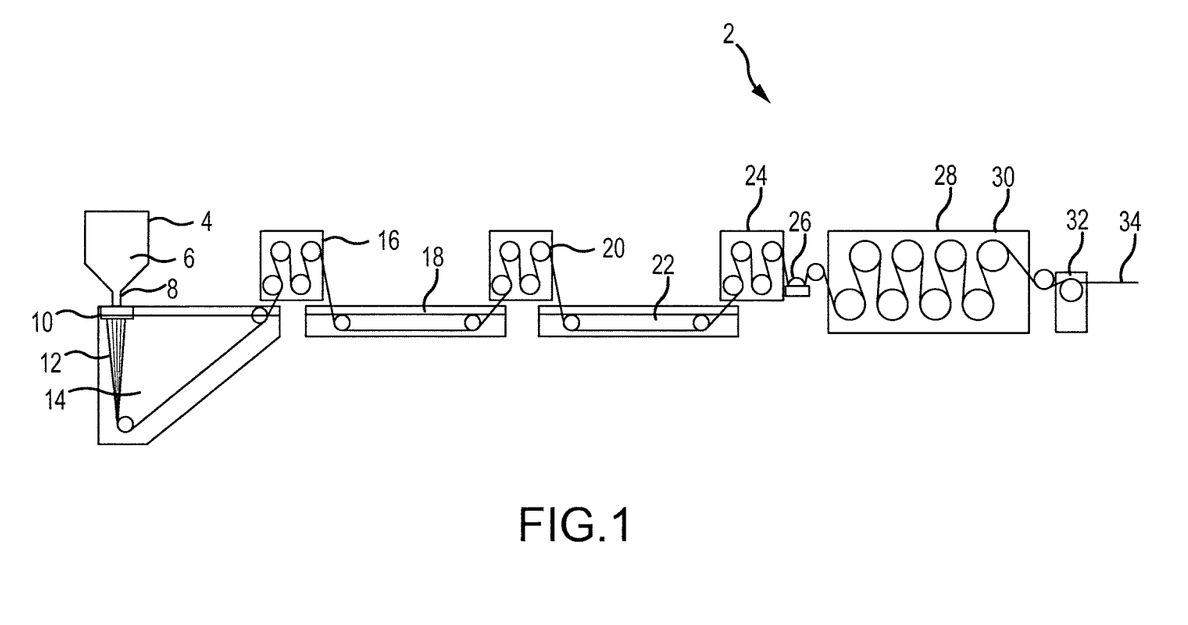
FIG. 1 illustrates a system for forming carbon fiber having a relatively high carbon fiber crystal orientation (CFCO), in accordance with various embodiments.

With reference to FIG. 1, a system 2 for creating a carbon fiber includes a spinner 4 that may receive a polymer resin 6. As will be described below, the polymer resin 6 is formed to have various characteristics that result in a relatively high CFCO of a resulting carbon fiber 34.

The system 2 further includes a filter for filtering debris from the polymer resin 6, along with a spinneret 10 that spins the polymer resin and outputs an acrylic fiber 12.

The system 2 further includes multiple rollers 16, 20, 24, 28 that pull the acrylic fiber 12 through various baths. In particular, a first roller 16 may pull the acrylic fiber 12 through a coagulation bath 14. A second roller 20 may pull the fiber through a washing bath 18 to wash debris from the fiber. A third roller 24 may pull the fiber through a stretching bath 22, resulting and stretching of the fiber.

The fiber may then be treated with a spin finish application 26 before being pulled by rollers 28 through a drying treatment 30. The fiber may be oxidized in the drying treatment 30 by heating the fiber to a predetermined temperature in order to create an oxidized fiber. The rollers 28 may stretch the fiber during the oxidation phase to create an oxidized fiber that has an oxidized fiber length that is greater than 100% of the length of the acrylic fiber 12. Such stretching during oxidation may further increase the CFCO of the carbon fiber 34.

The system 2 may further include a traversing take-up 32 that outputs the carbon fiber 34 from the system 2.

Figure 2:
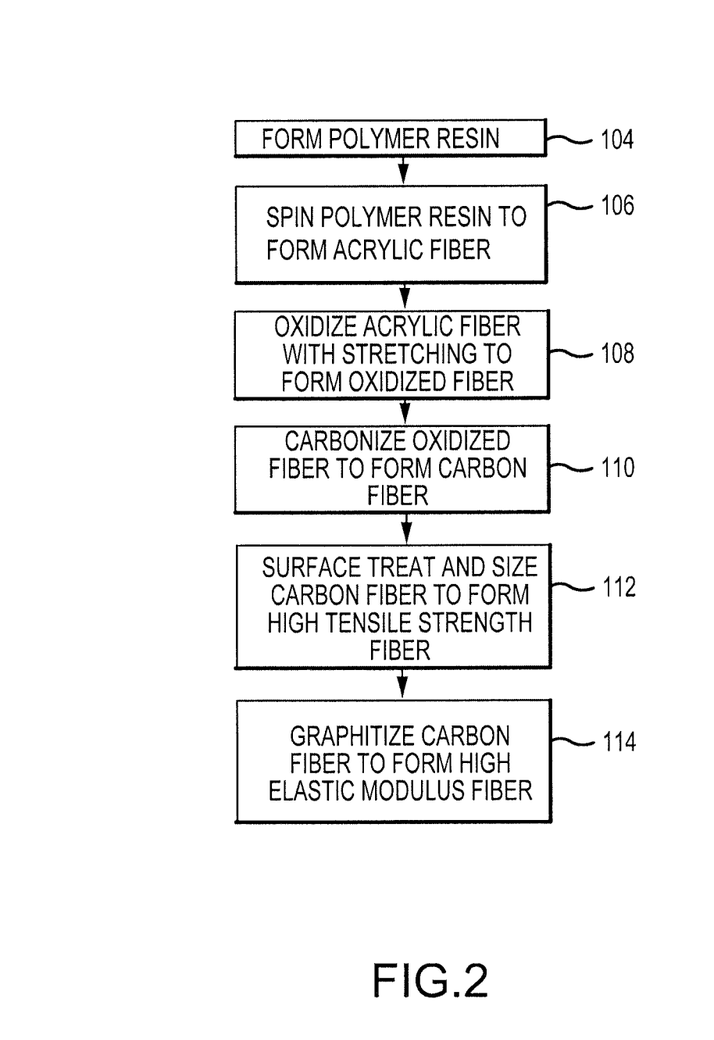
FIG. 2 illustrates a method for forming carbon fiber having a relatively high carbon fiber crystal orientation (CFCO), in accordance with various embodiments.

Turning now to FIG. 2, a method 100 for creating a carbon fiber having a relatively high CFCO is shown. In step 104, a polymer resin may be formed. The polymerization may result in a polymer having a relatively high molecular weight, a relatively narrow molecular weight distribution, and a relatively high isotactic content. The combination of one or more of the relatively high molecular weight, the relatively narrow molecular weight distribution, and the relatively high isotactic content may result in an increased CFCO of the resulting carbon fiber.

In particular, the polymer may be polymerized to have a molecular weight of at least 175,000 grams per mole (g/mol), 200,000 g/mol, or 225,000 g/mol. For example, the polymer may be a polyacrylonitrile polymer.

As is known in the art, molecular weight distribution may be measured using a polydispersity index (PDI). PDI is a measure of the distribution of molecular mass in a given polymer. In various embodiments, the polymer may be polymerized to have a PDI that is less than 2, or less than 2.5, or less than 3.

Figure 3A:
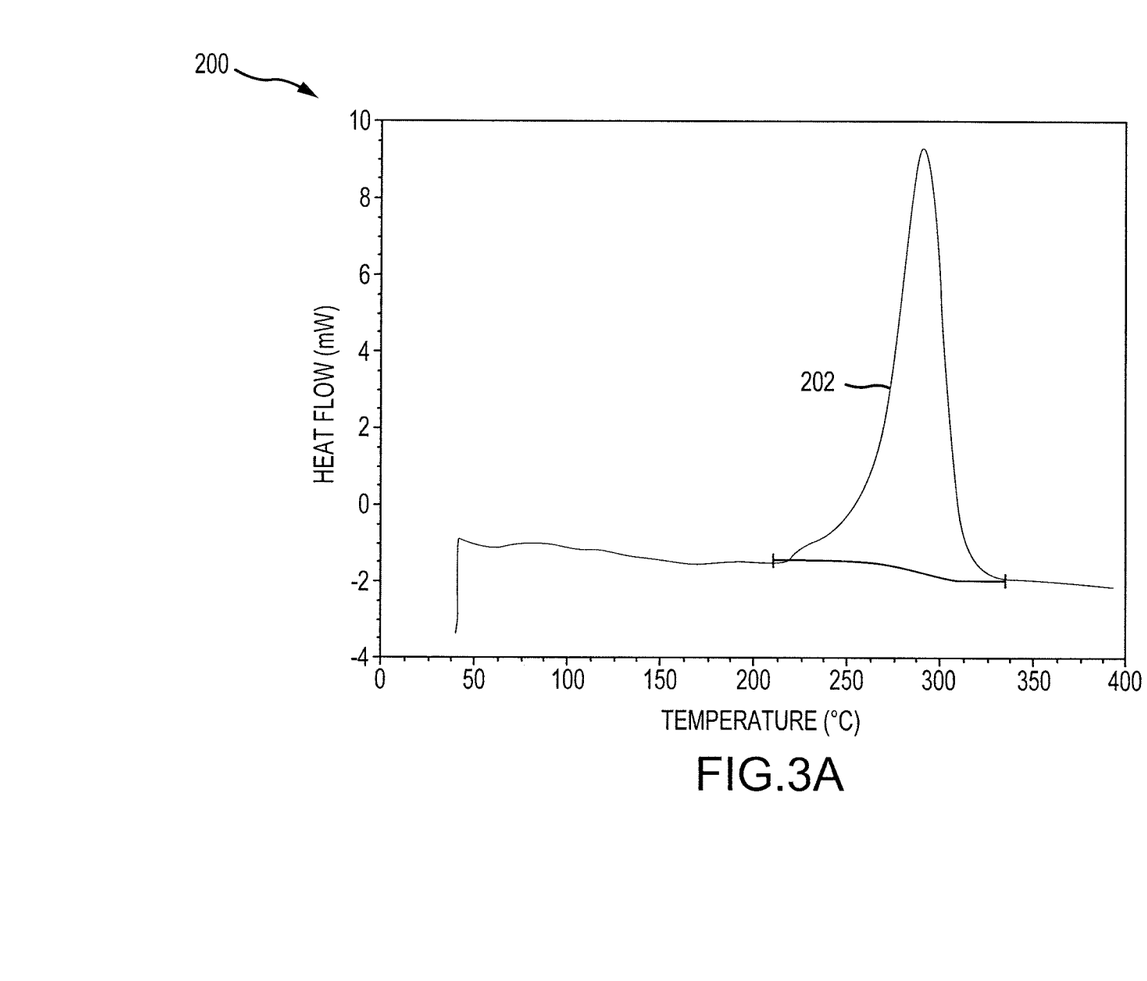
FIG. 3A illustrates heat flow through a carbon fiber formed using a preform that was polymerized to lack a small polymer chain, in accordance with various embodiments.
Figure 3B:
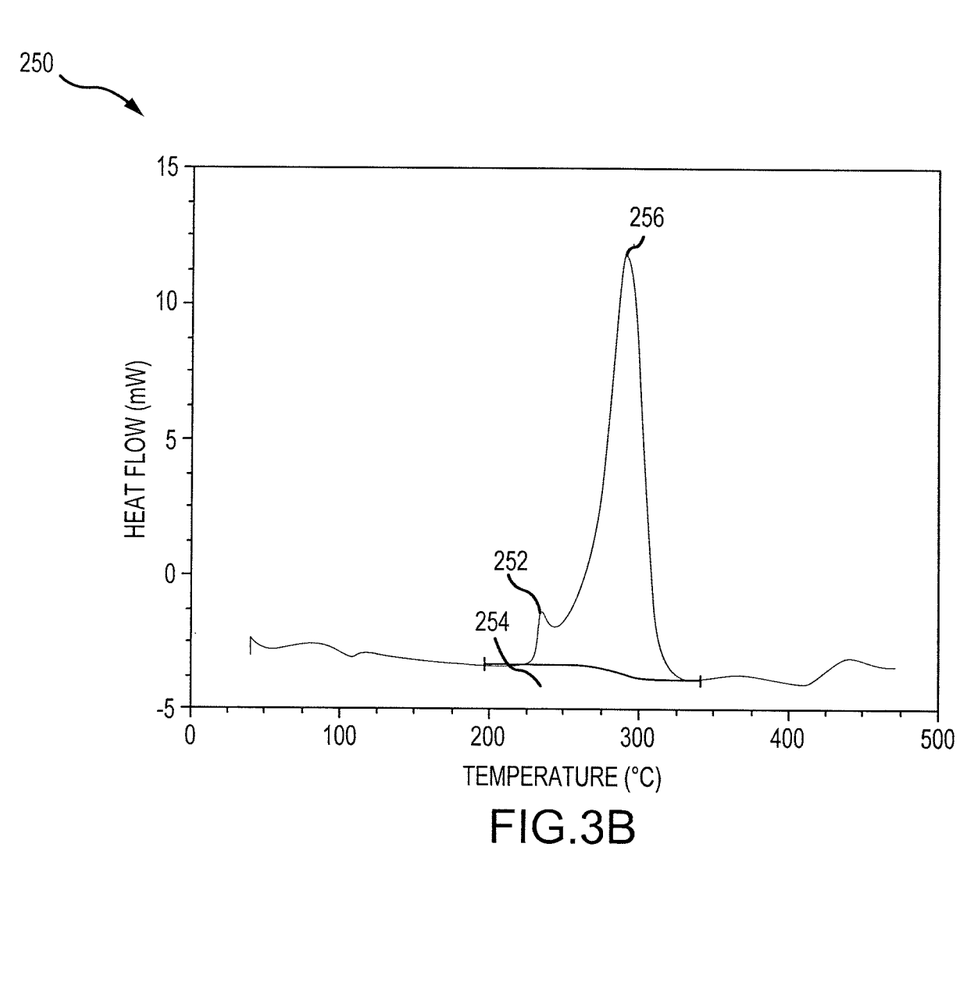
FIG. 3B illustrates heat flow through a carbon fiber formed using a preform that was polymerized to include a small polymer chain, in accordance with various embodiments.

Along the same lines, it may be desirable for the polymer to be polymerized to lack a small polymer chain, such as a polymer chain having 3,000, or 4,000, or 5,000 units or less. Polymer chain length may be measured or detected by measuring heat flow through the resulting carbon fiber as the carbon fiber is exposed to various temperatures. For example, the heat flow may be detected using a differential scanning calorimeter. For example and referring to FIG. 3A, a plot 200 illustrates heat flow through a carbon fiber that was formed using a carbon fiber preform that was polymerized to lack a small polymer chain. As shown, the heat flow includes a primary spike 202 without any secondary spikes. Referring now to FIG. 3B, a plot 250 illustrates heat flow through a carbon fiber that was formed using a carbon fiber preform that was polymerized to include a small polymer chain. As shown, the heat flow includes a primary spike 256 but also includes an undesirable pre-spike 252 at a lower temperature 254 than the primary spike 256.

Returning reference to FIG. 2, it may be further desirable for the carbon fiber preform to be polymerized to have a relatively high isotactic content. In particular, it may be desirable for the carbon fiber preform to be polymerized to have an isotactic content that is greater than 20%, or greater than 25%, or greater than 30% of monomer units that are isotactic relative to total monomer units in the chain.

Figure 4:
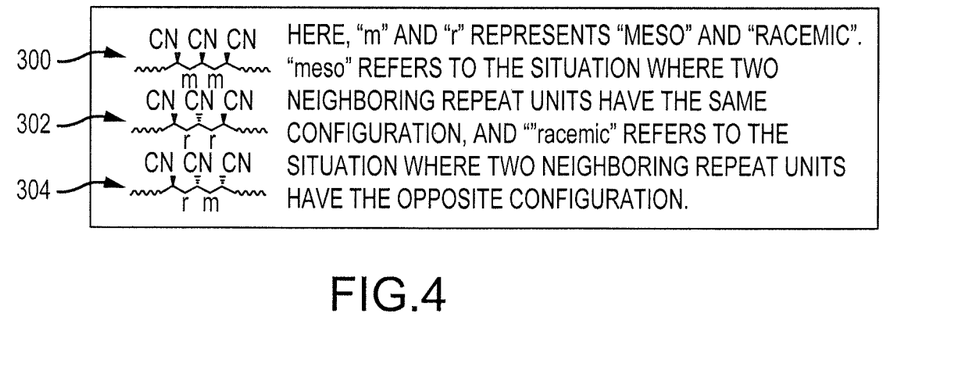
FIG. 4 illustrates a meso polymer, a racemic polymer, and a combined polymer, in accordance with various embodiments.

Isotactic content refers to the fact that neighboring units have the same configuration. For example and referring to FIG. 4, a first line 300 shows a MESO configuration (represented by the letter "m" and corresponding to isotactic content), a second line 304 shows a RACEMIC configuration (represented by the letter "r" and corresponding to non-isotactic content), and a third line 306 shows a combination configuration (also corresponding to non-isotactic content).

Figure 5A:
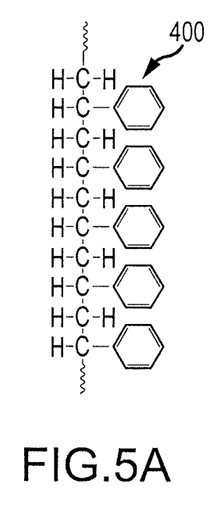
FIGS. 5A, 5B, and 5C illustrate an isotactic polymer chain, a syndiotactic polymer chain, and an atactic polymer chain, in accordance with various embodiments.
Figure 5B:
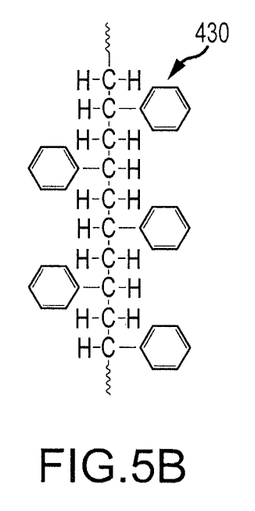
Figure 5C:
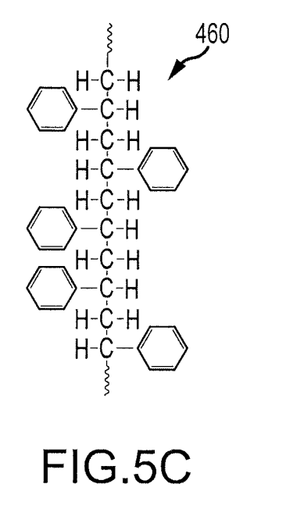

Furthermore and referring to FIGS. 5A, 5B, and 5C, an isotactic polymer chain 400, a syndiotactic polymer chain 430, and an atactic polymer chain 460 are shown. The isotactic polymer chain 400 is desirable. Polymerizing a polymer to have an isotactic content that is greater than 20%, or greater than 25%, or greater than 30% may result in a carbon fiber having a greater CFCO than polymerizing a polymer to have an isotactic content less than these values.

Returning reference to FIG. 2, the result of the polymerization process may be a polyacrylonitril, or other, resin.

In step 106, the polymer resin may go through a spinning process to form an acrylic fiber.

In step 108, the acrylic fiber may be oxidized. For example, the acrylic fiber may be heated to a predetermined temperature in order to facilitate oxidation of the acrylic fiber. It is been found that stretching the acrylic fiber between negative 15% and positive 20%, or between 0% and positive 20%, during the oxidation phase results in a carbon fiber having a greater CFCO than stretching that results in less than 0%. Stated differently, it may be desirable for the acrylic fiber to be stretched during oxidation to have an oxidized fiber length that is greater than or equal to 100% of an acrylic fiber length of the acrylic fiber. For example, it may be desirable for the oxidized fiber length to be at least one of greater than or equal to 100% and at least one of less than or equal to 120% of the acrylic fiber length. As another example, it may be desirable for the oxidized fiber length to be greater than or equal to 105% and less than or equal to 120% of the acrylic fiber length. Where used in this context, specific percentages are approximate and may refer to the specific percentage plus or minus 2%. For example, the phrase "equal to 100%" may refer to a value that is between 98% and 102%.

Figure 6:
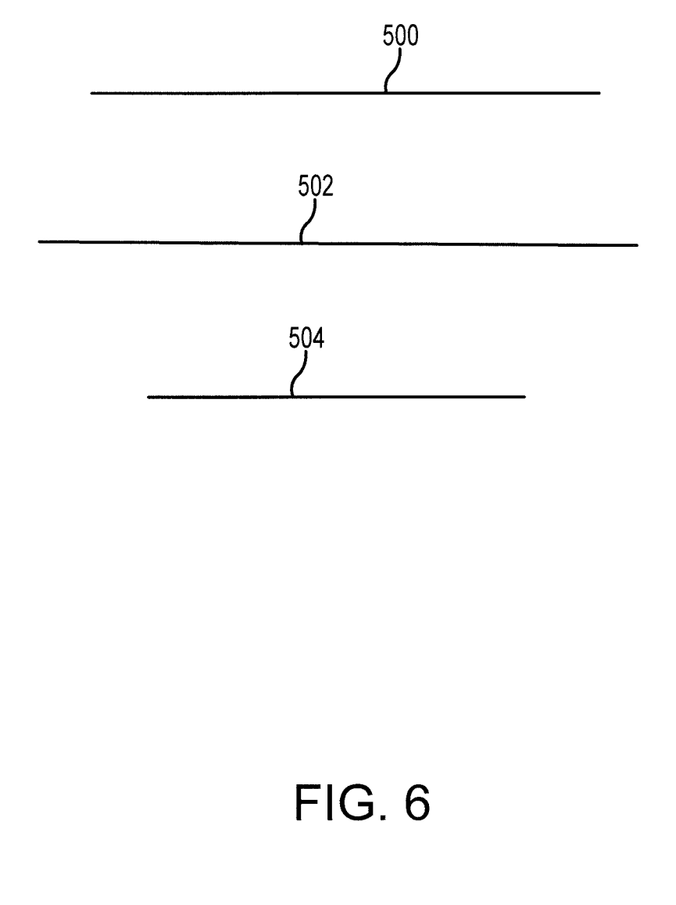
FIG. 6 illustrates an acrylic fiber, an oxidized fiber having an oxidized fiber length that is greater than an acrylic fiber length of the acrylic fiber (i.e., illustrating stretching), and an oxidized fiber having an oxidized fiber length that is less than the acrylic fiber length (i.e., illustrating shrinkage), in accordance with various embodiments.

For example and referring to FIG. 6, an acrylic fiber 500 and two oxidized fibers 502, 504 are shown. The acrylic fiber 500 may have an acrylic fiber length. The first oxidized fiber 502 may have an oxidized fiber length that is 110% of the acrylic fiber length. The second oxidized fiber 504 may have an oxidized fiber length that is 90% of the acrylic fiber length. It has been shown that stretching the acrylic fiber during the oxidation phase to create the oxidized fiber 502 results in a greater CFCO of the final carbon fiber than stretching the acrylic fiber during the oxidation phase to create the oxidized fiber 504.

Returning reference to FIG. 2, an oxidized fiber may be produced from the oxidation step 108. Cyclization index (C.I.) may be used as an indicator of a stabilization degree of the oxidized fiber (e.g., oxidized PAN fiber, or OPF). C.I. of the oxidized fiber may be calculated using the following equation 1:

$$\text{C.I.} = 1 - \Delta H(\text{oxidized fiber})/\Delta H(\text{acrylic fiber}) \qquad \text{Equation 1:}$$

In Equation 1, C.I. is the cyclization index, $\Delta H$ (oxidized fiber) is the total amount of exothermal heat of the oxidized fiber under nitrogen ($N_2$), and $\Delta H$ (acrylic fiber) is the total amount of exothermal heat of the acrylic fiber under $N_2$. It may be desirable for the C.I. of the oxidized fiber to be at least 0.65. In various embodiments, the C.I. of the oxidized fiber may be between 0.65 and 0.9, may be between 0.7 and 0.9, or may be between 0.75 and 0.9. Achieving a C.I. of the oxidized fiber of at least 0.65 may result in a desirable crystal orientation of the resulting carbon fiber, such as at least 80% crystal orientation.

The oxidized fiber may then be carbonized in step 110, resulting in a carbon fiber.

After carbonization, the carbon fiber may be subjected to surface treatment and sizing in step 112 based on the desired performance and use of the carbon fiber. In some embodiments, a carbon fiber having a relatively high tensile strength may result from the surface treatment and sizing. In various embodiments, the carbon fiber may be subjected to a graphitization process in step 114, resulting in a carbon fiber having a relatively high elastic modulus.

The combination of one or more of polymerizing the carbon fiber preform to have a relatively high molecular weight, polymerizing the carbon fiber preform to have a relatively low PDI, polymerizing the carbon fiber preform to have a high isotactic content, and stretching the acrylic fiber to have an oxidized fiber length that is greater than or equal to 100% of the acrylic fiber length results in a carbon fiber having a relatively high CFCO. For example, such a combination of one or more of the above may result in a carbon fiber having a CFCO of at least 75%, or at least 80%, or at least 85%, or at least 90%. Such a relatively high CFCO is desirable for carbon fiber that is used in friction disks of disk brake systems.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of making carbon fiber material having a carbon fiber crystal orientation of 80% or greater for use in friction disks, the method comprising:
    spinning a polymer resin to create an acrylic fiber having an acrylic fiber length, wherein the polymer resin has a polydispersity index (PDI) of less than 2.5 and comprises all polymer chain lengths greater than 5,000 units;
    oxidizing the acrylic fiber while stretching the acrylic fiber to create an oxidized fiber that has an oxidized fiber length that is greater than or equal to approximately 100 percent (100%) of the acrylic fiber length;
    determining a stabilization degree of the oxidized fiber, wherein the stabilization degree is determined by calculating a cyclization index that is a quotient of a total amount of exothermal heat of the oxidized fiber divided by a total amount of exothermal heat of the acrylic fiber;
    responsive to the oxidized fiber having a cyclization index of at least 0.65, carbonizing the oxidized fiber to create a carbon fiber; and
    graphitizing the carbon fiber.

2. The method of claim 1, wherein stretching the acrylic fiber includes stretching the acrylic fiber such that the oxidized fiber length is greater than approximately 100% and less than or equal to approximately 120% of the acrylic fiber length.

3. The method of claim 2, wherein stretching the acrylic fiber includes stretching the acrylic fiber such that the oxidized fiber length is greater than or equal to approximately 105% and less than or equal to approximately 120% of the acrylic fiber length.

4. The method of claim 1, wherein the polymer resin has a molecular weight that is greater than approximately 200,000 grams per mole.

5. The method of claim 1, wherein oxidizing the acrylic fiber includes oxidizing the acrylic fiber to have a cyclization index that is greater than or equal to 0.65.

6. A method of making carbon fiber material for use in friction disks, comprising:
    spinning a polymer resin to create an acrylic fiber, wherein the polymer resin has a polydispersity index (PDI) of less than 2.5 and comprises all polymer chain lengths greater than 5,000 units;
    oxidizing the acrylic fiber to create an oxidized fiber;
    determining a stabilization degree of the oxidized fiber, wherein the stabilization degree is determined by calculating a cyclization index that is a quotient of a total amount of exothermal heat of the oxidized fiber divided by a total amount of exothermal heat of the acrylic fiber;
    responsive to the oxidized fiber having a cyclization index of at least 0.65, carbonizing the oxidized fiber to create a carbon fiber; and
    graphitizing the carbon fiber, wherein after graphitizing the carbon fiber has a crystal orientation of 80% or greater.

7. The method of claim 6, wherein a molecular weight of the polymer resin is greater than approximately 200,000 grams per mole.

8. The method of claim 6, wherein the polymer resin includes polyacrylonitrile.

9. The method of claim 6, further comprising stretching the acrylic fiber during the oxidizing to cause the oxidized fiber to have an oxidized fiber length that is greater than or equal to approximately 100 percent (100%) of an acrylic fiber length of the acrylic fiber.

10. The method of claim 9, wherein stretching the acrylic fiber includes stretching the acrylic fiber such that the oxidized fiber length is greater than or equal to approximately 100% and less than or equal to approximately 120% of the acrylic fiber length.

11. The method of claim 10, wherein stretching the acrylic fiber includes stretching the acrylic fiber such that the oxidized fiber length is greater than or equal to approximately 105% and less than or equal to approximately 120% of the acrylic fiber length.

\* \* \* \* \*